United States Patent [19]

Streisand

[11] 3,725,597

[45] Apr. 3, 1973

[54] CALLING LINE IDENTIFICATION SYSTEM

[75] Inventor: Kenneth Streisand, East Brunswick, N.J.

[73] Assignee: Bell Telephone Laboratories, Incorporated, Murray Hill, N.J.

[22] Filed: July 1, 1971

[21] Appl. No.: 158,784

[52] U.S. Cl. ....................179/18 FH

[51] Int. Cl. ....................H04q 3/72

[58] Field of Search............179/18 FH, 27 DB, 17 A

[56] References Cited

UNITED STATES PATENTS 3,541,269 11/1970 Fritschi ....................179/18 FH

*Primary Examiner*—Thomas W. Brown
*Attorney*—R. J. Guenther et al.

[57] ABSTRACT

In a telephone calling line identification system a substantial increase in call tracing capacity is achieved by a timing arrangement in a simulated audible ring tone receiver that controls a scanner to the end that each line, rather than being held for a fixed period, is held only so long as a valid signal appears to be present, the line being released in response to the earliest indication that there is no valid signal.

8 Claims, 6 Drawing Figures

INVENTOR
K. STREISAND
BY
ATTORNEY

CALLING LINE IDENTIFICATION SYSTEM

BACKGROUND OF THE INVENTION

1. Field of the Invention

This invention relates to telephone calling line identification systems of the type that enables the identity of a calling station to be determined without, however, alerting the calling party.

2. Description of the Prior Art

In telephone systems and particularly in automatic systems, it is sometimes desirable to have the capability of tracing a telephone call to its origin. This need is evident, for example, in the case of anonymous calls, generally termed nuisance calls, which may be threatening, obscene, harassing or otherwise annoying and illegal. A variety of systems are known for trapping such callers by identifying the calling station while the call is being made. These systems are far from ideal, however, particularly in terms of the limited number of potential calling lines that may be checked during the often brief period of call tracing time that is available. Stated otherwise, the cost of broadly effective, substantially automatic call tracing using known systems is prohibitively expensive.

One illustrative prior art system is that disclosed by C. Abert, J. P. Runyon and A. Zarouni in U.S. Pat. No. 3,471,647 issued Oct. 7, 1969. In that system the called customer's line is arranged so that the usual application of a ringing signal is delayed to permit the nuisance call connection to be identified while the calling party is led to believe that normal ringing is taking place. Specifically, when a call connection is extended to the specially equipped called line, the normal central office ringing signal is tripped and a simulated audible ringing (SAR) signal, which simulates conventional ringing, is transmitted back over the connection to the calling customer. Upon hearing the SAR signal, the nuisance caller assumes that the called station is being rung in the usual fashion. Instead, however, the connection has already been completed and detecting equipment at the calling customer's office is scanned over groups of circuits such as outgoing trunks, searching for the presence of SAR signal. Once the trunk involved in the nuisance call connection is located, the scanner locks on to the trunk, holding the local switch train at the calling office.

After the ringing signal at the called customer's office is delayed long enough to permit the scanner at the calling office to locate the nuisance call connection, a normal ringing signal is applied to alert the called customer. When the called customer answers, the connection is automatically held for a predetermined interval under control of the scanner circuitry to prevent the calling customer from disconnecting. It is during this interval that the called party has the option of concluding that the call is legitimate, in which case he proceeds routinely with the call, or of concluding that the call is of the nuisance type in which case he initiates action to effect the final stage of the tracing operation. In the instance of a nuisance call the customer merely signals his central office by means of his telephone dial or other signaling device. At the calling office, the called party's signal is detected and steps are taken to identify the calling customer either by manually tracing the connection or by using conventional automatic number identification (ANI) equipment. Should the called customer decide not to initiate identification of the calling line, the scanning circuitry times out automatically and removes the holding condition from the connection.

SUMMARY OF THE INVENTION

The principles of the invention rest in part on a realization that the time required to scan a given number of points under the control of an SAR signal receiver can be substantially reduced, with attendant reduction in the equipment needed, by keeping the method of determining that a signal is valid essentially independent from the method of determining that a signal is invalid. Additionally, faster scanning is accomplished, in effect, by taking advantage of the statistics of talk-off performance.

A key aspect of the invention involves exploiting the principle that while some fixed period of scan time is required for a reasonable probability of determining that a signal is valid, considerably less time, on the average, is required to determine that no valid signal is present.

In accordance with a feature of the invention the scanner, under the control of the SAR signal receiver, takes a preliminary look at a group of lines for a fixed, relatively brief period such as 25 ms with the receiver in a wideband, high sensitivity mode. If a signal is detected on this look, the passband and sensitivity are reduced for a more discriminating look. Although a fixed time, such as 300 ms, is required to determine that a particular signal is valid, if the signal disappears for 20 ms, no substantial accuracy is lost by regarding the signal as invalid, terminating the scan and shifting to the next group of lines. As a result, the scan time per line, rather than being fixed, as called for by conventional practice, is made variable depending upon the particular combination of speech, noise and tones that appear on each signal line. Using the above illustrative periods of a minimum scan time per line of 25 ms and a maximum scan time of 300 ms, the time to scan 200 circuits can vary between 5 and 60 seconds with the most likely time, under severe conditions, being in the neighborhood of 7 seconds.

Another feature of the invention relates to a signal OFF timer in the SAR receiver that operates in terms of cumulative OFF time so that whenever a preselected duration of signal holes is accumulated, such as 20 ms, for example, a scanner advance signal is generated.

Another key feature of the invention is the employment of a so-called hub circuit, or belt line, to synchronize the application of SAR at the called customer's line with the operation of the scanner at the calling customer's line. In prior art systems with a fixed scan time per line, such as the one disclosed by Abert et al., the scanners scanned continuously without any synchronization. If a scanner had not reached a particular scan point on the first ringing cycle it would pass the point on the silent interval. However, arrival at that point during the next ringing cycle was assured. Since, in accordance with the invention, the time that the scanner spends on each line is variable, dependent upon speech, noise and tones on the line, it is impossible to ensure that a line will be scanned during the transmission of any number of cycles of SAR if the scanner runs continuously. By synchronizing the scanner with the transmission of SAR, however, scanning takes place only when tone is transmitted. In accordance with this arrangement, scanning stops during the silent interval and on the next ringing cycle picks up at the same place that it left off. Since there is no prior knowledge as to the identity of the call originating office, all scanners in a defined geographical area (defined for calling line identification purposes) are synchronized with the same hub. Additionally, all SAR generators located at the called customer's central offices within that area are synchronized with that hub. Such synchronization requires a separate network or path between all offices tied in for CLI and the central hub. Implementation of this belt line in accordance with the invention may be achieved, for example, by the use of a central clock continuously sending ON/OFF signals for 2 seconds ON, 4 seconds OFF in normal ringing cadence to all scanners and all specially equipped called customers' lines. The scanners scan during all the ON periods, and when calls are placed to a specially equipped customer, SAR is transmitted during the ON periods. In accordance with a more sophisticated embodiment the clock may be operated only when calls are actually placed to the specially equipped customers. This arrangement enjoys the advantage of prolonging the life of the scanner as well as the advantage of starting the SAR signal immediately rather than accepting the possibility of adding in extra delay by coming in during a silent interval (i.e., when the timer is OFF).

The overall effectiveness of a system in accordance with the invention is reflected by its capability of scanning 1,000 circuits with five SAR receivers (200 circuits per receiver) whereas prior art systems typically scan 200 circuits with ten SAR receivers (20 circuits per receiver).

DETAILED DESCRIPTION

General — System Arrangement

The essence of the invention disclosed herein relates primarily to an SAR signal receiver. Certain features of the receiver cannot be fully appreciated, however, outside of the context of a complete calling line identification system. Accordingly, a simplified block diagram of the full system is presented in FIG. 1. Each of the individual blocks of FIG. 1, with the exception of the SAR receiver 109, represents items of equipment that are well known in the prior art, many being disclosed for example in the patent to Abert et al., cited above. Nevertheless, a brief description of the entire system appears appropriate to ensure completeness in the disclosure of the invention. Additionally, such a description provides a useful background for a detailed discussion of the receiver itself.

Figure 1:
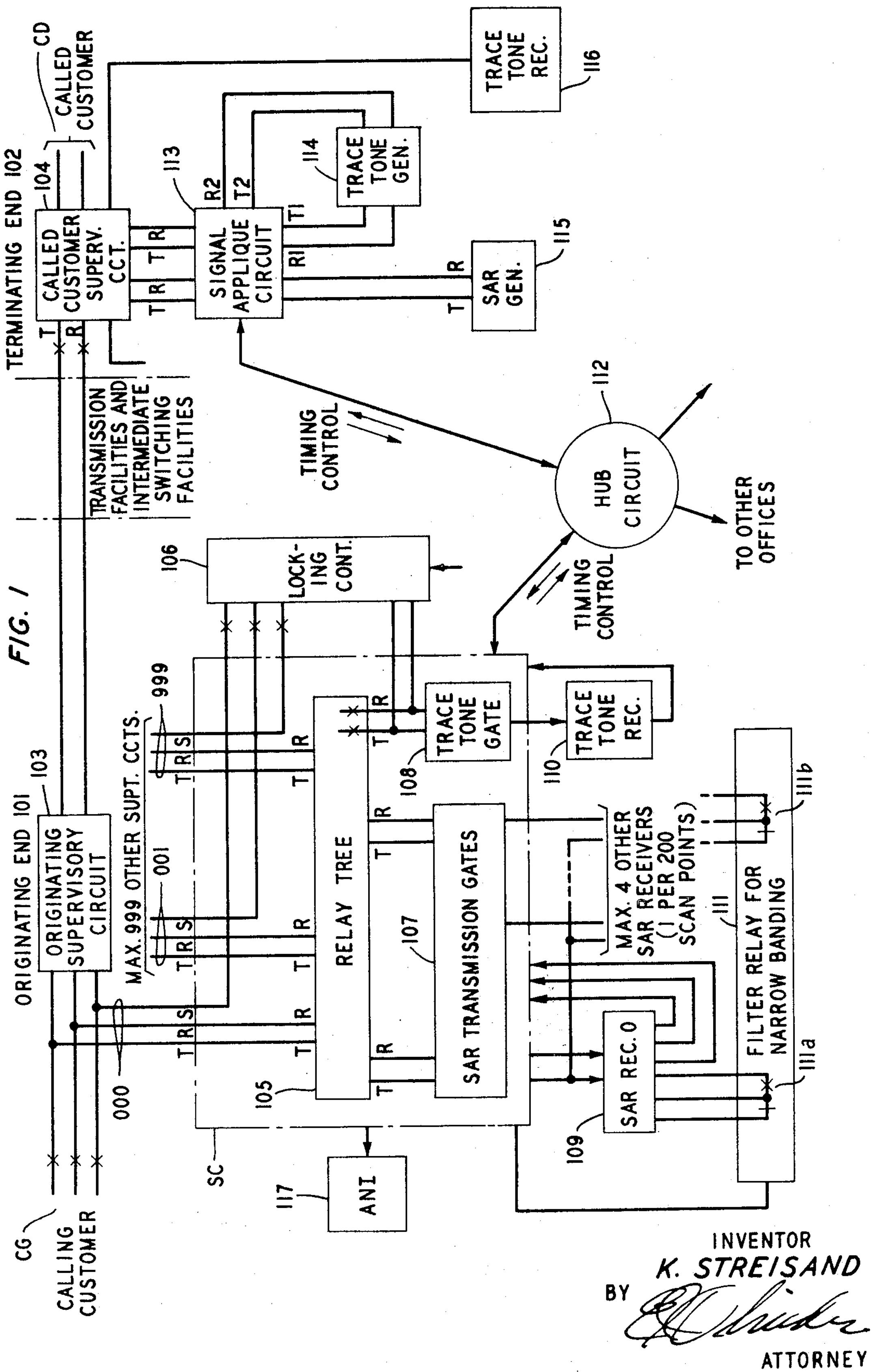
FIG. 1 is a block diagram of a system in accordance with the invention.

As shown in FIG. 1, an originating end office 101 having call tracing capability employs a scanner SC that includes a relay tree 105 and a group of SAR transmission gates 107. Also considered as part of the scanner SC is a locking control circuit 106 and a filter relay 111 that is used for narrowbanding the SAR signal receiver 109. This narrowbanding may instead be accomplished within the SAR receiver 109 itself. However, since all receivers are narrowbanded simultaneously it is more economical to have a common narrowbanding relay associated with the scanner. The narrowbanding operation will be explained in greater detail as a part of the discussion of the SAR receiver. One additional part of the scanner SC is a trace tone gate 108 which merely gates in signals from the trace tone receiver 110 from which point they are applied to the automatic number identification equipment (ANI) 117.

Equipment at the terminating end 102 includes a called customer supervisory circuit 104 and a signal applique circuit 113 which serves as an interface circuit between the SAR generator 115 and trace tone generator 114 and the line T–R.

System Operation

When a call is placed from the calling customer CG at the originating end 101 to a called customer CD at the terminating end 102 whose line has been equipped for calling line identification, switching action by the called customer supervisory circuit 104 initiates operation of the simulated audible ringing (SAR) signal generator 115. The SAR signal, in lieu of normal ringing, is routed to the calling customer CG at the originating end 101. The reason for generating the SAR tone to sound like an audible ring is to avoid confusing normal calling customer as well as to avoid arousing the suspicion of nuisance callers.

At this point the scanner SC at the originating end 101 starts its scan of up to a thousand trunks, 000–999, looking for an SAR signal. In accordance with the invention, five SAR receivers (only one of which, 109, is shown) are employed to operate with each scanner.

The scanner SC and the SAR generator 115 are synchronized by a hub circuit 112 which allows the scanner SC to scan only when SAR tone is being transmitted. During the silent interval of the ringing cycle the scanner is stopped and on the next ringing cycle it resumes where it left off on the previous cycle. The scanning operation consists of the scanner SC connecting each one of a first group of five circuits (T–R pairs) to a respective one of the five SAR receivers 109. Initially, each receiver 109 is in the wideband mode. If no signals resembling SAR are detected by any of the five receivers within 25 ms, the scanner SC shifts its scan by means of its relay tree 105 to the next group of five circuits and then repeats the operation.

If, instead, one of the SAR receivers 109 detects the simultaneous presence of the two signaling frequencies of the SAR generator, the scanner SC is prevented from advancing or shifting its scan point and all receivers are "narrowbanded" by means of the filter relay 111 so that the signals can be examined more closely. In accordance with the invention, each of the receivers 109 has the feature of being able to notify the scanner SC as soon as it decides that the signal is not a valid SAR signal. As a result, the scanner SC is permitted to shift to the next set of five lines as soon as all receivers give this "no signal" indication. In a great majority of scans this shifting action occurs within 70 ms of the beginning of the scan. On signals that initially appear to be valid, the receiver stays on the line somewhere between 255 and 300 ms before arriving at a final decision that the signal is valid. In general, the scanner is able to scan 1,000 lines with five SAR receivers during relatively high traffic conditions with a very high probability (e.g., 94 percent) of reaching the line containing the SAR. This action is normally accomplished within three ringing cycles which provides approximately 7.2 seconds of productive scan time. In order to minimize the delay in answering legitimate as well as nuisance calls, ringing of the called customer's telephone is arranged to begin one second into the second SAR ringing cycle. However, in order to ensure that a full three cycles of SAR are transmitted, the line is not "cut through" until the end of the third SAR ringing cycle.

On a valid SAR the scanner SC stops and applies a trace-tone receiver 110 to the line on which the SAR was detected. Once the called customer CD has answered his telephone, he has 25 seconds to determine whether the call is a legitimate call or a nuisance call. If it is legitimate he does nothing. If however the call is of the nuisance variety, he dials the digit "2". The dialed signal passes directly through the transmission facilities to the trace-tone receiver 110 at the scanner SC if the called customer CD generates it by means of pushbutton multifrequency signaling. If, instead, conventional rotary dial pulse signaling is employed, the signal applique circuit 113 at the called customer's central office will, under the control of the called customer supervisory circuit 104, activate the trace-tone generator 113 which generates a corresponding multifrequency tone signal. If a trace-tone signal is not received within 25 seconds of the time the called customer CD answers his telephone, the scanner SC automatically disconnects.

SAR Receiver-Details

Figures 2, 3A, 4:
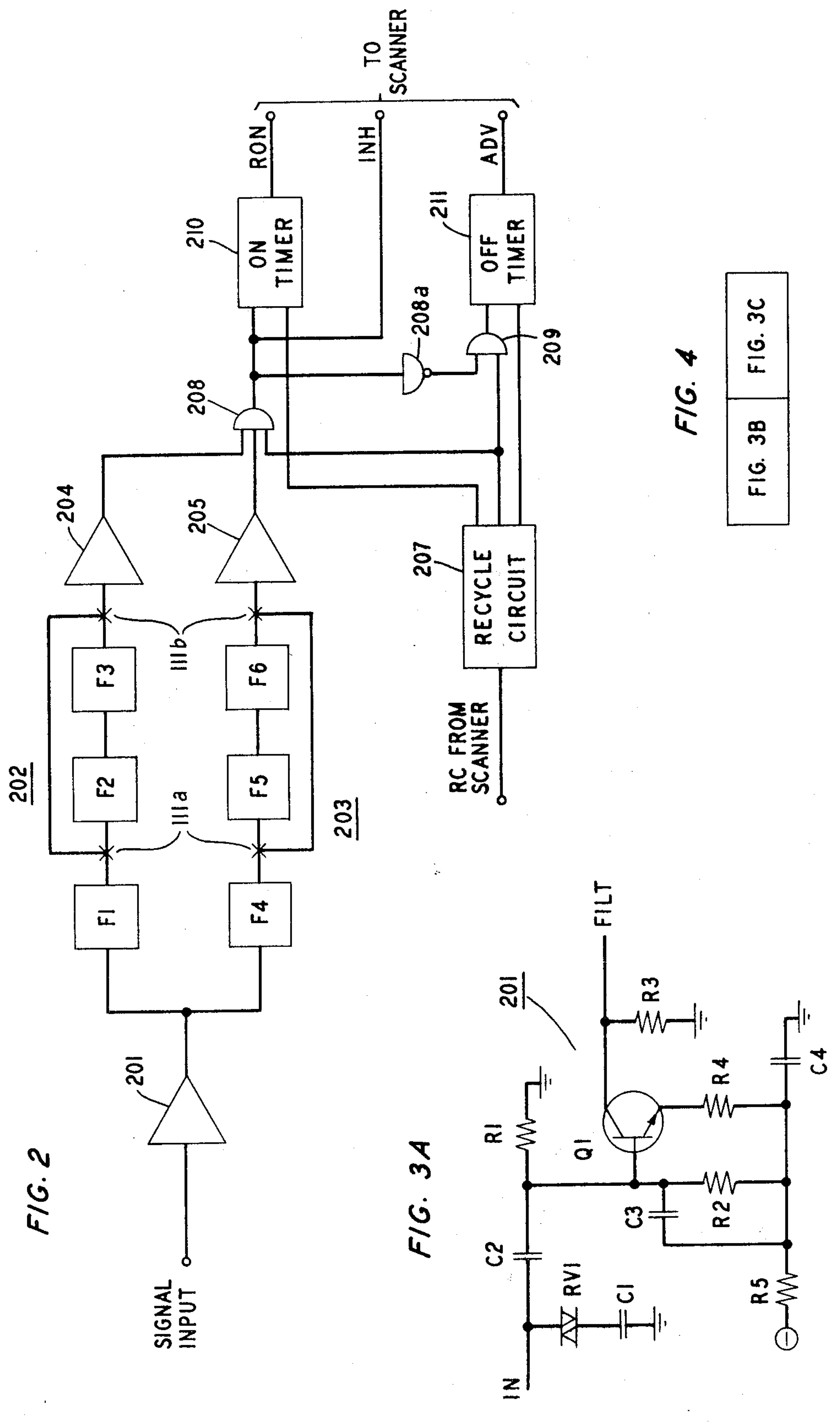
FIG. 2 is a block diagram of an SAR signal receiver in accordance with the invention.
FIG. 3A, 3B, and 3C, taken together present a schematic circuit diagram of a portion of the receiver shown in block form in FIG. 2.
FIG. 4 is a block diagram showing the relation between FIG. 3B and 3C.
Figure 3B:
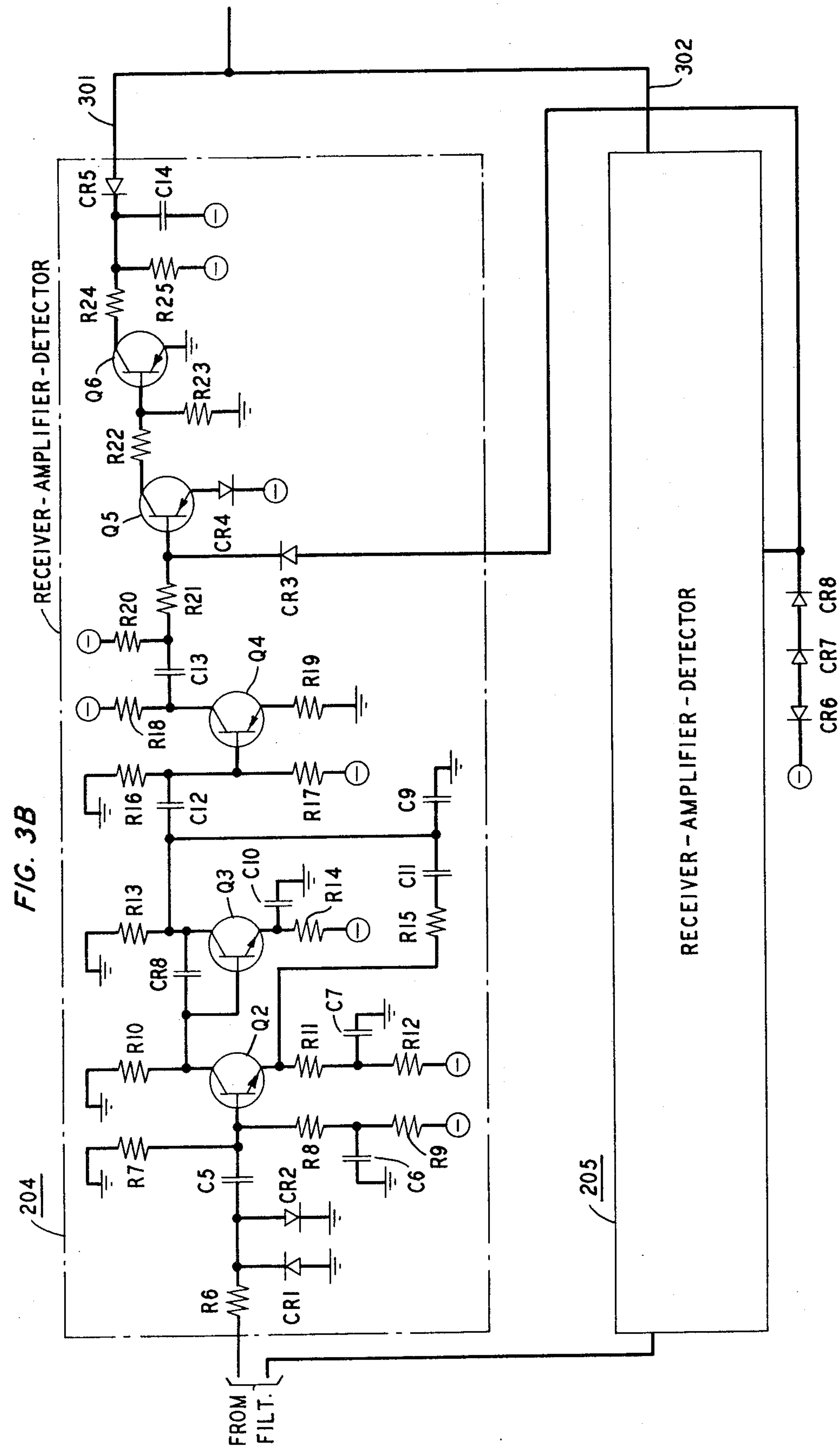
Figure 3C:
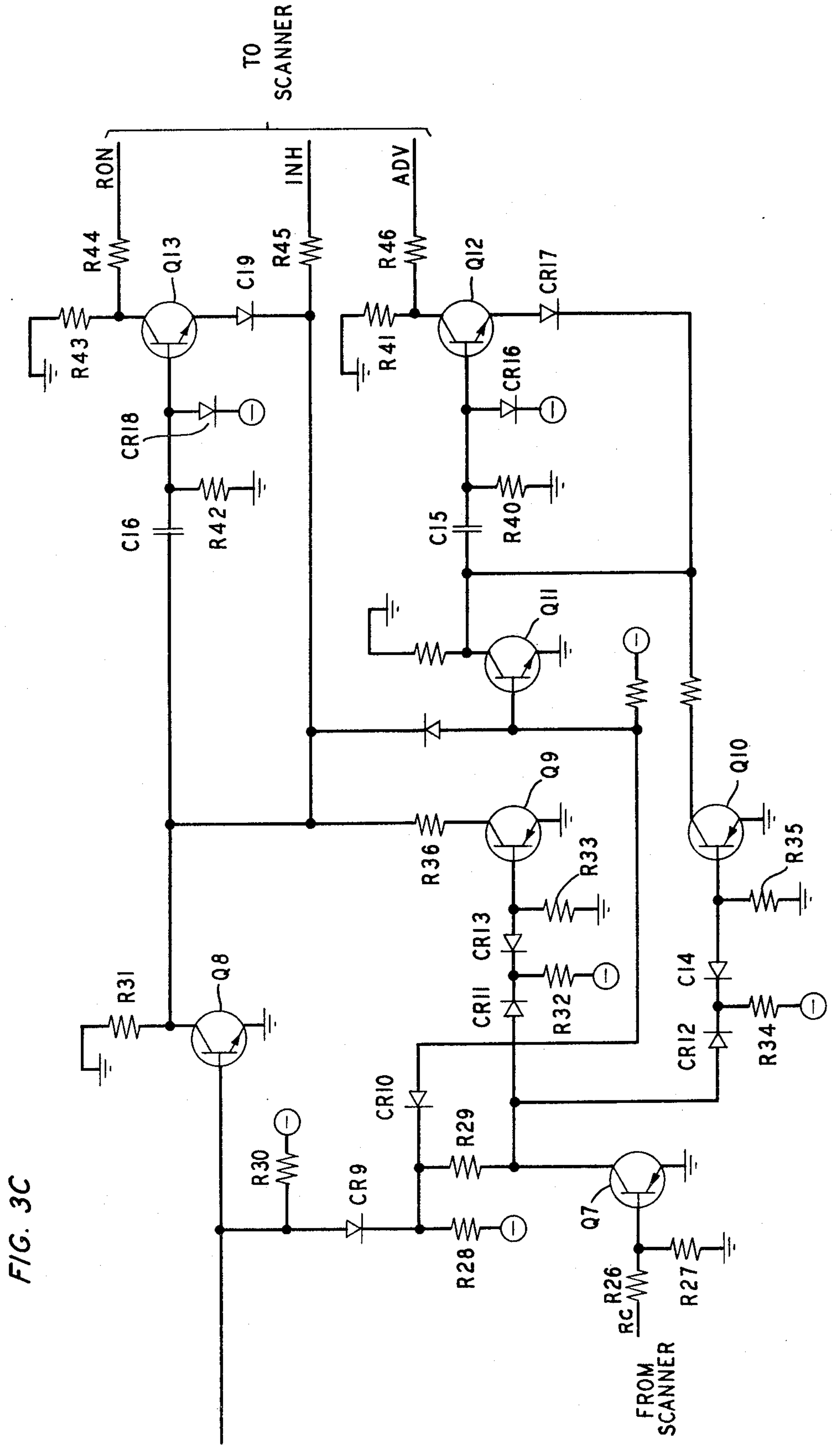

As indicated above, the essence of the invention lies in the SAR receiver 109 shown as a single block in FIG. 1. FIG. 2 shows an SAR receiver in more detailed block form while the input amplifier is shown in detail in FIG. 3A and the limiter-amplifier-detector, recycle and timer circuits are shown in schematic circuit diagram form in FIG. 3A, 3B and 3C. As shown in FIG. 2 the receiver includes a total of six functional units, four of which are employed to process the combined signal and two of which are employed to process each of the two signaling frequencies. The input amplifier 201 is common, the two sharp bandpass filters 202 and 203 operate on a one per frequency basis, the limiter amplifiers and detectors 204 and 205 operate on a one per frequency basis while the ON and OFF timers 210 and 211 and the recycle circuit 207 are common. The scanner circuit SC, FIG. 1, bridges tip and ring TR with the line at high impedance, so as not to interfere with signals on the line, and provides unity gain between the line and the SAR receiver input amplifier 201.

As shown in FIG. 2, input amplifier 201 drives each of two filters 202 and 203. Filter 202 employs three active filter sections F1, F2, F3 and, similarly, filter 203 employs filter sections F4, F5, and F6. Three sections are required to obtain the desired filter sharpness with the center frequencies of each filter section staggered to obtain the proper bandwidth. The center section, which is physically the first filter section (F1, F4), is tuned to the nominal or center signaling frequency and the outside sections are tuned several Hz above and below, respectively. The first section output, used in the first 25 ms of the scan for the so-called "first look," provides a 6.0 db gain in signal level while the overall filter used as a final determination of the validity of the signal provides a 2.0 db gain. These gains are at the filter's nominal frequency, with the response dropping off very sharply outside the desired passband.

The limiter-amplifier-detector section consists of two like units 204 and 205. Each limiter amplifier is driven by a single frequency signal from its respective filter. The purpose of the limiter is to provide to the amplifier stages which follow a signal whose amplitude does not increase more than 12 db above the minimum level for detection. Such limitation prevents overloading in the amplifier stages that follow. The amplifier sections of each of these two circuits 204 and 205 are designed to turn on at an accurately established threshold level.

A recycle circuit 207 serves the primary function of providing gates which control certain timing functions in the receiver. The recycle circuit 207 is directed by the scanner which applies negative battery or ground by way of an RC lead depending upon conditions within the scanner and the receiver. The recycle circuit 207 provides an output which is applied to an AND gate 208 for driving the ON timer 210 and to an AND gate 209 for driving the OFF timer 211. Additionally it recycles both timers during nontiming intervals.

The first 20 ms period of each scan is used to allow signal energy from the previous scan to decay and to allow signal energy from the present scan to build up in the bandpass filters 202 and 203. These decay and build-up times are a direct consequence of the sharpness of the filters. Thus, during this period the scanner applies ground to the RC lead causing the recycle circuit 207 to hold both AND gates 208 and 209 OFF while discharging both timers 210 and 211 that had built up a charge during the previous scan. After 20 ms there is sufficient buildup in the filters' first sections (F1 and F4) to give an indication as to whether the signal resembles SAR. A 5.0 ms interval is used to check for this buildup. Therefore, between $t$=20 and 25 ms, negative battery is applied to the RC lead causing the recycler's inputs to both AND gates 208 and 209 to go high and both timer recycler switches to go off. Since the other two inputs to AND gate 208 which drives the ON timer 210 are the two signal detectors of the (limiter-amplifier-detector) LIM-AMP-DET circuits 204 and 205, the output of the AND gate 208 will change state if the signal resembles SAR. ON timing then begins and a signal from the ON timer AND gate 208 to the scanner SC by way of the INH or inhibit lead notifies the scanner SC to take a further look at the signal. If no INH signal appears from any of the SAR receivers during this 5.0 ms interval, the scanner moves to the next line and repeats the operation.

The recycle circuit 207 and the output from the ON timer AND gate 208 provide the inputs to the OFF timer AND gate 209. AND gate 209 turns on when the recycle circuit 207 is on and the ON timer AND gate is off. This action occurs only when negative battery is applied to the RC lead (i.e., during the initial interval between 20 and 25 ms) and when at least one frequency detector is not energized. Hence, depending upon the momentary states of the detectors 204 and 205, both the ON timer 210 and the OFF timer 211 may begin charging, although not simultaneously, during this 5.0 ms interval. However, since both timers had been previously discharged and the ON timer 210 requires 205 ms of charging time, while the OFF timer 211 requires 20 ms, neither will give an output during this 5.0 ms interval.

If the first look made by the scanner SC gives an indication of a valid SAR signal, the scanner initiates a second look. At $t$=25 ms, ground is reapplied to the RC lead causing the recycle circuit 207 to release both AND gates 208 and 209 and also to recycle both timers 210 and 211. The filter relay 111, FIG. 1, is operated at this time and contacts 111*a* and 111*b* switch the filter output driving the LIM-AMP-DET 204, 205 from the first section (F1, F4) to the full three sections. At $t$=50 ms, buildup in the entire three section filter is completed and at that point the signal can be timed. Negative battery is applied to the RC lead opening the AND gates to the frequency detectors and suspending the recycling of the two timers 210 and 211. Note that the two timers 210 and 211 will have been completely recycled by this time.

The ON timer 210 gives a RON (receive off normal) output signal if the ON timer AND gate 208 is on, uninterruptedly, for 205 ms. Thus, adding the 205 ms ON timing to the 50 ms allowed for the filter buildup, it is evident that the receiver will deliver a valid signal output no earlier than 255 ms into the scan period. If there are only a few very brief interruptions in the signal, the output will appear between 255 and 300 ms. However, if there is a cumulative OFF timing of 20 ms owing to interruptions in the signal, the OFF timer 211 sends an ADV (advance) signal to the scanner indicating that the signal is not valid and that the scanner should advance to the next line. Because the ON timer 210 slowly recycles itself during holes in the signal (while the OFF timer 211 is timing), it is possible to have a situation where neither timer operates before $t$=300 ms. This condition would usually occur for small holes near the end of the ON timing cycle where the effect of self-recycling is most severe. In this case, if neither timer gives an output by 300 ms the scanner automatically moves to the next line.

Detailed Operational Description of SAR Receiver Circuit Input Amplifier

As shown in FIG. 3A, signals entering the receiver pass through a d.c. blocking capacitor C2 and are applied to the base of a transistor Q1. A limiter circuit which consists of a varistor RV1 and a capacitor C1 connected at the input prevents high level signals and switching transients from overdriving the transistor amplifier. It also limits ringing (20 Hz) and dial pulsing signals, thereby preventing their harmonics in the signal frequency range from falsely operating the receiver. The amplifier preferably has an input impedance of about 10 K-ohms in order to match the output impedance of the scanner and an output impedance of 19.3 K-ohms for feeding the high input impedance filters, 202 and 203, FIG. 2. The d.c. bias on transistor Q1 is determined by resistors R1 through R5, and the combination of a resistor R5 and a capacitor C4 acts as a decoupling network to prevent power supply noise from entering the amplifier. The input capacitor C2 in conjunction with capacitor C3 shapes the frequency response curve of the amplifier in order to pass SAR signals while attenuating lower and higher frequencies.

Filters

As indicated above and as shown in FIG. 2, input amplifier 201 drives two active RC filter circuits 202 and 203. These filters are substantially conventional, may take a variety of forms and, accordingly, are shown in block form only. One filter 202 has a center frequency at 520 Hz and the other filter 203 has a center frequency at 580 Hz. Each filter circuit includes three sections in tandem, F1, F2 and F3 for the filter 202 and F4, F5 and F6 for the filter 203. It has been found advantageous for each section to employ two operational amplifiers with feedback. In each case the first section, F1 and F4, is tuned to the desired center frequency, while the other two, F2–F3 and F5–F6 are tuned approximately 8.0 Hz above and below the center frequency, respectively. The first filter section, F1 and F4, has the lowest Q of the three sections.

The tuning arrangement described produces the rise time, bandwidth and sharp roll-off characteristics that are needed to meet the design requirements of the receiver. Each filter circuit is preferably designed to have a voltage gain of 2.0 db for its entire three sections and 6.0 db at its first section, assuming an 11 K-ohm input impedance for the limiter amplifiers 204 and 205.

Limiter Amplifier

The output signals from each of the filters 202 and 203 are applied to the input of the individual limiter-amplifier-detector units 204 and 205, respectively, as shown in FIG. 2. These units are substantially identical for the two channels and, accordingly, only one unit 204 is shown in detail in FIG. 3B. The limiter, which includes resistor R6, diode CR1 and diode CR2, serves to restrict the maximum signal level entering the amplifiers to 12 db above the detector threshold. Following the limiter circuit is a two-stage amplifier employing negative feedback. The two transistors Q2 and Q3 are direct coupled and the feedback path is from the collector of transistor Q3 through the network comprising resistor R15 and capacitor C11 to the emitter of transistor Q2. Resistors R7, R8 and R9 and capacitor C6 set the base bias on transistor Q2, while resistors R11 and R12 and capacitor C7 provide emitter bias. The combinations of resistor R9 and capacitor C6 and resistor R12 and capacitor C7 serve as power supply decoupling networks for the base and emitter, respectively. The emitter of transistor Q3 is biased by resistor R14 and capacitor C10. The output of transistor Q3 passes through a coupling capacitor C12 to transistor Q4 which is a single stage common emitter amplifier. Resistors R16 and R17 provide bias on the base; resistor R19 is the emitter bias resistor and resistor R18 is the collector load resistor. The overall gain of the amplifier stages Q2, Q3 and Q4 is set at 39.3 db for signals below the limiting level.

Capacitor C8 in conjunction with resistors R11, R13, R15, R16 and R17 shape the response of the limiter amplifier to provide a roll-off at higher frequencies, the 3.0 db point being about 13 K-Hz. Capacitor C9 prevents high frequency oscillations which might otherwise occur at approximately 90 MHz.

Detector

Transistors Q5 and Q6 form a level detecting circuit which turns on if the signal applied to it exceeds an accurately set threshold level. Signals leaving the previous amplifier stage, transistor Q4, pass through a coupling capacitor C13 and a resistor R21 to the base of transistor Q5 which is biased at −48 volts by resistor R20. When transistor Q5 is turned off, its emitter is biased at −39.8 volts through the diode CR4. When transistor Q5 is on, the emitter voltage is −39.1 volts owing to the 0.7 volt drop across the diode CR4. Diode CR4 is normally used to prevent breakdown of transistor Q5 when the base emitter junction is reverse biased. Accordingly, allowing for a 0.7 volt base-to-emitter voltage drop, transistor Q5 turns on when the base signal is −38.4 volts, corresponding to a 9.6 volt peak threshold detection level. Transistor Q5 responds only to the positive half cycles of the signals applied to it, with the base voltage limiting at −38.4 volts for all positive signals exceeding this threshold. In order to prevent capacitor C11 from charging during these ON periods and changing the d.c. level at the base of transistor Q5, the negative half cycles are symmetrically limited to −57.6 volts by a voltage regulator diode CR6 and by diodes CR3, CR7 and CR8.

When transistor Q5 is off the base of transistor Q6 is at ground potential. Since the emitter is also at ground, the transistor is held off. Whenever transistor Q5 turns on, the voltage at the base of transistor Q6 drops to −0.7 volts and transistor Q6 turns on.

When transistor Q6 is off, diode CR5 is forward biased and current flows from the −36.3 volt supply through resistor R30, diode CR5 and resistor R25 to the −48 volt supply. As transistor Q6 turns on, the voltage at the cathode of diode CR5 rises from about −40 volts to about −8.0 volts which back biases the diode so that current cannot flow. Since both transistors Q5 and Q6 respond to the positive half cycles of the applied signal, capacitor C14 is incorporated to keep diode CR5 back biased during negative half cycles when transistor Q6 is off, and to bridge any small holes in the signal. Diodes CR5, CR5.1 and CR9 are the three inputs to the ON timer AND gate, transistor Q8, which turns on only when all three diodes are simultaneously back biased. Diodes CR5 and CR5.1 (not shown) will be back biased when valid signals, 520 Hz and 580 Hz, respectively, are present at the receiver input. Elements employing a decimal point designator herein, although not individually shown, are used to indicate elements in the SAR amplifier detector unit 205 which correspond to similarly numbered elements in the SAR amplifier detector unit 204. The state of diode CR9 is determined by the recycle circuit.

Recycle Circuit

The recycle circuit comprises transistor switches Q7, Q9 and Q10. Transistor Q7 receives the recycle signal from the scanner and drives switches Q9 and Q10 which discharge the ON timer and OFF timer, respectively. In addition, transistor Q7 supplies inputs to both the ON and OFF timer AND gates.

With ground (or open) applied to the RC lead by the scanner, transistor Q7 is not forward biased and remains off. Diodes CR9 and CR10 are forward biased, preventing both AND gates (transistors Q8 and Q11) from operating, while diodes CR11 and CR12 are back biased, allowing transistor Q9 to turn on by base current supplied through a shifter diode CR13 and a resistor R32. Transistor Q10 turns on as the result of base current supplied through a shifter diode CR14 and a resistor R34. Transistor switch Q9 discharges the ON timing capacitor C16 through resistor R36, while transistor switch Q10 discharges the OFF timing capacitor C15 through resistor R39. The timers are discharged to prevent energy stored during the previous scan or during the first look of the present scan from influencing the timing of the present scan.

When negative battery is applied to the RC lead, base current is supplied through resistor R26 to operate transistor Q7. Diodes CR9 and CR10 are back biased, allowing the ON timer AND gate, transistor Q8, to operate when both detectors are turned on and allowing the OFF timer AND gate, transistor Q11, to operate when the ON timer AND gate is not operated. Current flowing from the collector of transistor Q7 through diodes CR11 and CR12 in conjunction with the shifter diodes CR13 and CR14, keep transistors Q9 and Q10 off, allowing both timers to build up charge under control of their respective AND gates.

ON Timer AND Gate

The ON timer AND gate, transistor Q8, operates when all three inputs to it (from transistors Q6, Q6.1 and Q7) are on. In this case, diodes CR5, CR5.1 and CR9 are reverse biased, allowing current to flow from the −36.3 volt supply through resistor R30 to the base of transistor Q8. If one of the three fan-in transistors is off, current will flow from the −36.3 volt supply through resistor R30, through the forward biased diodes CR5, CR5.1 or CR9 and through either resistors R25, R25.1 or R28 to the −48 volt supply. The base voltage will be about −40 volts, preventing transistor Q8 from turning on. If a second fan-in transistor is off, current through resistor R30 is provided with two paths to the −48 volt supply thereby lowering the base voltage slightly. With all three fan-in transistors off, the base voltage is even lower. In no case, however, is the base emitter reverse voltage sufficient to cause transistor breakdown.

The output of transistor Q8 is used to notify the scanner to look again at the signal after the 25 ms "first look" interval. This signal is normally at ground potential during the interval from $t$=20 to $t$=25 ms and switches to −39.4 volts with no termination. Resistor R45 protects transistor Q8 against some of the impedances or voltages which might inadvertently be applied to the output terminal.

OFF Timer AND Gate

The OFF timer AND gate, transistor Q11, operates when both inputs to it (i.e., from transistors Q7 and Q8) are high (from the voltage standpoint). Since transistor Q7 is a PNP transistor and transistor Q8 is an NPN transistor, this statement of conditions seems to imply that transistor Q7 is on and transistor Q8 is off. Under these conditions, diodes CR10 and CR15 are reverse biased, allowing current to flow from the −34.9 volt supply through resistor R37 and to return to the base of transistor Q11. If transistor Q7 is off (transistor Q8 will be off also), current flows from the −34.9 volt supply through resistor R37, diode CR10 and resistor R28 to the −48 volt supply. The base voltage of transistor Q11 is at about −41 volts which prevents it from turning on. If both transistors Q7 and Q8 are on (indicating that the ON timer is operating), current will flow from the −34.9 volt supply through resistor R37, diode CR15 and transistor Q8 to the −39.8 volt supply. The base of transistor Q11 is then clamped to −38.7 volts, back biasing transistor Q11 and preventing it from turning on.

ON and OFF Timers

The ON timer delivers a RON signal to the scanner when a valid SAR signal is received. It is directly controlled by the ON timer AND gate and the timer recycle switch. ON timing takes place when the ON timer AND gate, transistor Q8, is operated, causing voltage to build up on the timing capacitor C16 until it reaches a threshold level turning on a transistor switch Q13. This switch operation will occur after 205 ms of timing and will put a negative voltage on the RON lead to signal the scanner that a valid SAR signal has been received. If the ON timer AND gate, transistor Q8, releases during the timing cycle, owing to holes in the signal, the timing capacitor C16 slowly discharges itself. Timing resumes when the signal appears normal again provided that, in the meantime, the signal has not been declared invalid by the OFF timer, transistor Q11, or that the maximum scan time of 300 ms has not been reached. The timer recycle switch, transistor Q9, produces a quick discharge of the timer capacitor C16 and can only operate while the ON timer AND gate, transistor Q8, is off. This switch is operated at the beginning of the scan for 20 ms prior to the first look at the signal and for 25 ms (between $t$=25 ms and $t$=50 ms) prior to the second look, provided that the second look is necessary.

The ON timer is a "log 2" timer whose operate time is determined by capacitor C16 and resistor R42. With transistor Q8 off, the base of transistor Q13 is held to −36.3 volts by current flowing from ground through resistor R42 and diode CR18 to the −37.0 volt supply. Diode CR19 prevents reverse base-emitter voltage breakdowns during this time. Transistor Q8 turning on causes its collector voltage to drop from ground to −39.4 volts. Since the voltage across capacitor C16 cannot change instantaneously, the base voltage of transistor Q13 drops by an equal amount (from −36.3 volts to −75.7 volts). Capacitor C16 begins to discharge toward ground through resistor R42. Since the emitter voltage of transistor Q13 is now −38.7 volts (allowing 0.4 volt collector-emitter-voltage drop in transistor Q8 and a 0.7 volt drop across diode CR19), transistor Q13 cannot turn on until capacitor C16 has discharged to −38.0 volts. The discharge time of the capacitor C16 to this voltage level is 205 ms. If the timing is interrupted because of holes in the SAR signal, the timing capacitor C16 returns to its normal charge with a time constant equal to the product of resistor R31 in parallel with the sum of resistor R45 and the input impedance of the scanner on the INH lead which is 22.6 K-ohms and capacitor C16. If it is interrupted because a new scan is beginning, the timing capacitor returns to its normal charge with a time constant equal to the product of resistor R36 and capacitor C16.

When a valid SAR signal is received, an output is produced by transistor Q13 which appears on the RON terminal. The output signal is normally at ground potential and switches to −38.3 volts (with no termination). An output signal is present, however, as soon as a valid SAR signal is detected and timed and remains on until either the input signal is interrupted or the RC lead is grounded (or opened). An interrupted signal will cause the RON lead to return to its idle state with a small delay owing to the filter delay time, while a grounding or opening of the RC lead causes the RON lead to go immediately to its idle state.

The OFF timer delivers an ADV signal to the scanner when the signal is found to be invalid. This action occurs during the second look at a signal which had appeared initially to be valid on the short, weakly discriminating first look. The operation of the OFF timer is basically the same as the ON timer previously described with the exception that it is controlled by the OFF timer AND gate, transistor Q11, instead of the ON timer AND gate. The timing period is 20 ms and it is determined by the timing capacitor C15 operating transistor switch Q12. The output to the scanner, a negative voltage on the ADV lead, indicates that the signal is invalid and that the scanner should advance to the next line. One major difference between the OFF timer and the ON timer is that the OFF timing capacitor C15 does not discharge itself during holes in the timing. Hence, the 20 ms used to determine that a signal is invalid is cumulative. When the OFF timing is suspended owing to the scanner's application of ground (or open) to the RC lead, the OFF timer recycle switch causes the timing capacitor C15 to return rapidly to its normal charge with a time constant equal to the product of resistor R39 and capacitor C15.

When the SAR signal is determined to be invalid, an output is produced by transistor Q12 which appears on the ADV terminal. This output is normally at ground potential and switches to −36.9 volts with no termination. This signal is present as soon as the SAR signal is determined to be invalid and remains on until either the ON timer AND gate, transistor Q8, operates (indicating that a signal of the proper amplitude and frequencies is now being received) or the RC lead is grounded or open. The reappearance of the SAR signal will cause the ADV lead to return to its idle state with a small delay owing to the filter rise time, while the grounding or opening of the RC lead causes the ADV lead to go immediately to its idle state. Resistors R44 and R46 protect transistors Q13 and Q12, respectively, against some impedances or voltages which might inadvertently be applied to the output terminals.

It is to be understood that the embodiment described herein is merely illustrative of the principles of the invention. Various modifications thereto may be effected by persons skilled in the art without departing from the spirit and scope of the invention.

What is claimed is:

1. In a telephone call tracing system, in combination, first means for applying a simulated ringing signal to a calling line, second means for line scanning and detecting said signal, said second means including timing means for effecting monitoring of each line to be tested for an automatically variable period of time dependent upon the presence or absence of a signal on said named line which resembles said simulated ringing signal, and means for synchronizing said first means with said second means.

2. Apparatus in accordance with claim 1 wherein said timing means comprises a first timer for timing the duration of apparently valid signals, a second timer for timing the cumulative duration of breaks in said apparently valid signal, said second timer generating a scanner advance signal after a preselected cumulative duration of said breaks.

3. Apparatus in accordance with claim 2 including means responsive to a signal from said second means for discharging said second timer to a normal charge condition.

4. Apparatus in accordance with claim 2 wherein said first timer includes means for resetting said first timer to its initial condition at a first rate in response to interruptions in an otherwise apparently valid signal and means for resetting said first timer to its initial condition at a second rate in response to the beginning of a new scan.

5. In a telephone call tracing system, in combination, means for applying a simulated audible ringing (SAR) signal to a called line, means for scanning successive groups of lines in search of said signal and means for detecting the presence of signals having the basic characteristics of said SAR signal, said detecting means including means for holding said scanner on a particular line for an extended period provided that said signal on said line appears to be a valid SAR signal, and means for releasing said last named line at the earliest indication that said last named line does not contain a valid signal, said indication including a preselected cumulative duration of breaks in said last named signal, whereby the period of scan carried out by said scanning means is made variable, being dependent upon the nature of the signals appearing on said lines.

6. Apparatus in accordance with claim 5 wherein said detecting means includes means for placing said detecting means in a relatively wideband high sensitivity mode of operation for a first relatively brief period of operation by said scanning means and means responsive to the detection of an apparently valid SAR signal during said period for reducing the bandwidth and sensitivity of said detecting means.

7. Apparatus in accordance with claim 5 wherein said holding means includes a first timing circuit for timing the duration of apparently valid SAR signals and wherein said releasing means includes a second timing circuit for timing the cumulative duration of said breaks.

8. Apparatus in accordance with claim 7 wherein said SAR signal includes a plurality of frequencies, said detecting means includes first and second detector circuits in parallel relation each generating a respective output in response to a respective one of the frequencies in said SAR signal, a timer recycle circuit for generating an output in response to an input from said scanner, first and second AND gates, said first AND gate having inputs from said recycle circuit and from said outputs from said detectors, said second AND gate having inputs from said recycle circuit and from the output from said first AND gate, means for applying the output from said first AND gate to said first timing circuit, and means for applying the output from said second AND gate to said second timing circuit.

* * * * *